United States Patent
Tsai

(10) Patent No.: US 7,125,125 B2
(45) Date of Patent: Oct. 24, 2006

(54) BURNER DEBRIS COLLECTION APPARATUS FOR PROJECTORS

(75) Inventor: Wen-Wei Tsai, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 253 days.

(21) Appl. No.: 10/940,633

(22) Filed: Sep. 15, 2004

(65) Prior Publication Data

US 2006/0057519 A1    Mar. 16, 2006

(51) Int. Cl.
G03B 21/14    (2006.01)
G03B 21/22    (2006.01)

(52) U.S. Cl. .................................... 353/119
(58) Field of Classification Search ............. 353/85, 353/119, 87; 362/362, 548, 374, 375
See application file for complete search history.

(56) References Cited

U.S. PATENT DOCUMENTS 6,523,960 B1 *  2/2003  Watanabe .............. 353/98

2001/0021006 A1    9/2001  Shimizu
2003/0071977 A1    4/2003  Miyamoto et al.
2004/0233399 A1   11/2004  Katsuma et al.

FOREIGN PATENT DOCUMENTS

| EP | 1 093 013 A2 | 4/2001 |
| EP | 1 195 640 A1 | 4/2002 |
| TW | 562913 | 9/2000 |

* cited by examiner

Primary Examiner—Melissa Jan Koval
Assistant Examiner—Andrew Kong
(74) Attorney, Agent, or Firm—Birch, Stewart, Kolasch &Birch, LLP

(57) ABSTRACT

A burner debris collection apparatus for projectors aims to assist collecting burner debris includes debris collection ducts located on a bracing bracket which holds a socket and tracks located on the bracing bracket for mounting the socket by sliding. The debris collection ducts communicate with the tracks. After a burner has been blasted, the burner debris scattered in the tracks are pushed by a replacing socket (including a good burner) into the debris collection ducts. A debris collection tray may be provided on the debris discharge outlets of the debris collection ducts to collect the discharged burner debris.

7 Claims, 7 Drawing Sheets

BURNER DEBRIS COLLECTION APPARATUS FOR PROJECTORS

FIELD OF THE INVENTION

The present invention relates to a burner debris collection apparatus for projectors and particularly to a collection apparatus that collects burner debris scattered in the mounting tracks of the socket through debris collection ducts.

BACKGROUND OF THE INVENTION

Ellipsoidal ultra-high pressure discharge lamps (UHPs) can generate great brightness and high luminance, thus are widely used as the main lighting source on projectors or optical instruments. In general, the burner of a UHP discharge lamp includes a bulb filled with a high pressure inertial gas (about 180 atm.–250 atm.). The bulb is made from amorphous quartz glass durable to temperature about 1300° C. . The optimal operation temperature is 900° C.–1100° C. The bulb could blast if the temperature were not properly controlled. Moreover, quality defects also will cause the bulb to blast.

The burner of the UHP discharge lamp or halogen lamp generally is mounted in a sealed chamber surrounding by an ellipsoidal reflection cup and a transparent front lamp shade. The reflection cup is mounted on a socket which is movably installed on an optical module of the projector. Such a modular design allows the damaged burner and the socket to be removed together for replacement when the burner has been damaged or blasted. As the UHP discharge lamp operates at a high temperature, the reflection cup. or the socket generally has ventilation apertures to facilitate heat dissipation so that cooling air can flow into the lamp shape to disperse heat of the burner.

While such a design resolves the heat dissipation problem, it also creates channels to scatter the debris when the burner blasts. To prevent the burner debris from scattering around while maintaining the heat dissipation function, some projectors have a filter installed in the channels leading to the exterior (sucn as R.O.C. patent publication No. 562913, entitled "Light source and projectors). But such a design makes handling of the burner debris very difficult.

In general, the socket is removed from the bottom of the projector for replacement. When the burner has blasted or replacement is needed, the projector has to be turned upside down to expose the socket. Then the socket and the blasted burner may be removed together. The common practice is to send the projector to the vendor's repair center for replacement and debris clearing by the professionals. The heat dissipation design of the reflection hood mentioned above makes clearing of burner debris difficult. This is especially true for the burner debris scattered in the mounting tracks of the socket.

SUMMARY OF THE INVENTION

Therefore it is a primary object of the present invention to provide a collection apparatus to assist collecting burner debris scattered in the mounting tracks of the socket.

To achieve the foregoing object, the socket of the invention adopts a sliding design for installing on the tracks of a bracing bracket. The bracing bracket has debris collection ducts communicating with tracks. After a UHP discharge lamp or halogen lamp has blasted, the operator removes the socket and the damaged burner from the bracket of the projector, and clears most of the burner debris. Then he/she places a replacing socket with a good burner on the bracket through the tracks. The debris trapped in the tracks are pushed and slide into the debris collection ducts through an opening.

Another object of the invention is to provide a collection apparatus to assist collecting burner debris scattered in the mounting tracks of the socket and discharge the burner debris easily.

To achieve the object mentioned above, the debris collection duct has a discharge outlet directing downwards. When the burner and the socket have been replaced, and the projector is turned to the upright position, the burner debris collected in the debris collection duct drop out of the projector due to gravity force.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
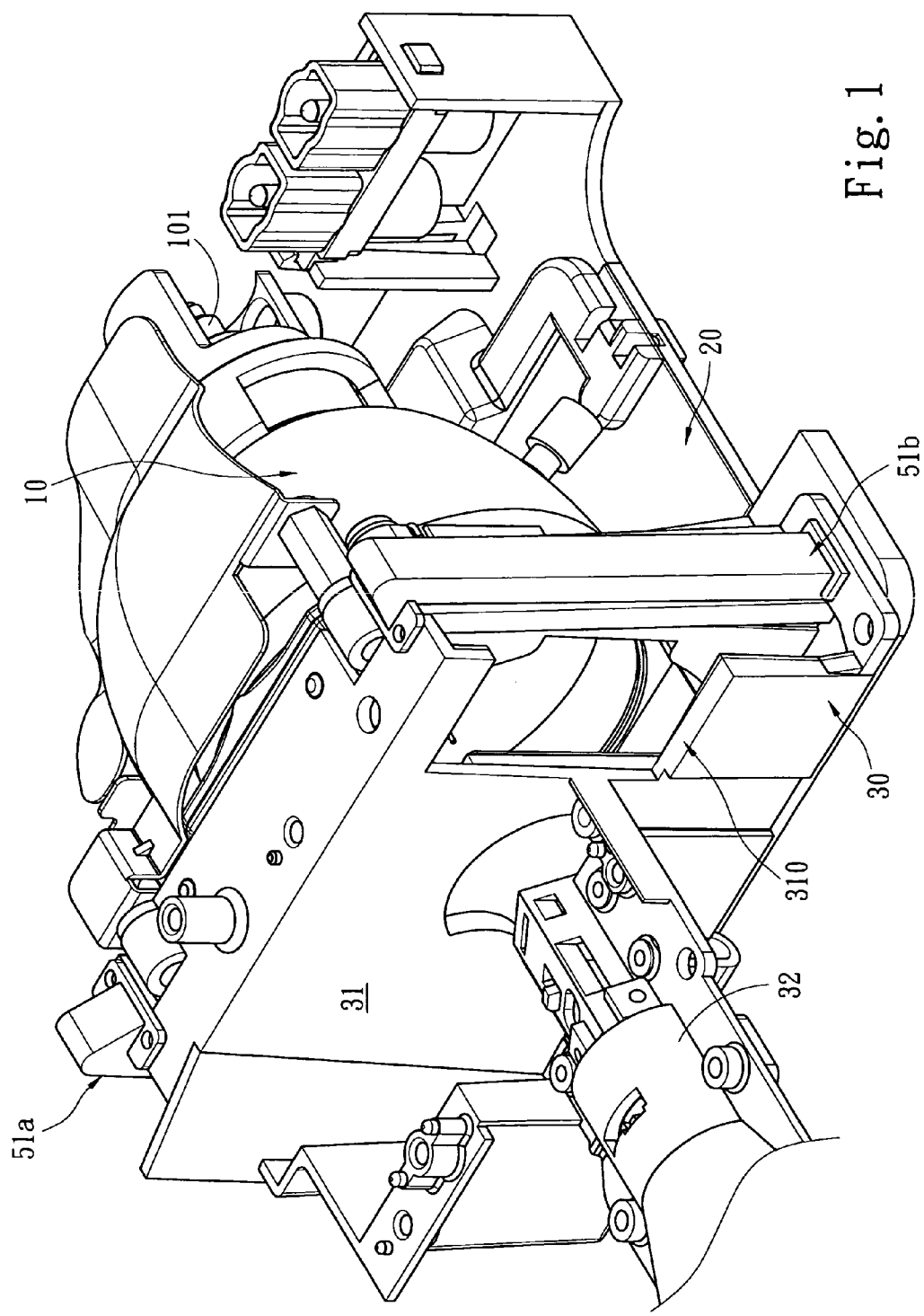
FIG. 1 is a schematic view of the present invention showing the socket and the bracing bracket in a coupled condition.

Please referring to FIG. 1, a burner of a UHP discharge lamp (or halogen lamp) is mounted in a reflection cup 10. The burner has an electrode connection contact 101 exposed on the back side of the reflection cup 10 which is fastened to a socket 20. The socket 20 is movably mounted on a bracing bracket 30 to prevent the debris of blasted burner from scattering around. The bracing bracket 30 generally is located on the opening end of the reflection cup 10 (namely where light projects out) to provide a desired deterrence. In an embodiment of the invention, it is accomplished through a barrier surface 31. The barrier surface 31 has a ventilation port 310 to allow cooling air to enter the reflection cup 10 to cool the UHP discharge lamp. In addition, the barrier surface 31 is coupled with an integrated rod 32 to channel the light reflected by the reflection cup 10 to related optical elements (these form no part of the invention, thus are not shown in the drawings).

Figure 2:
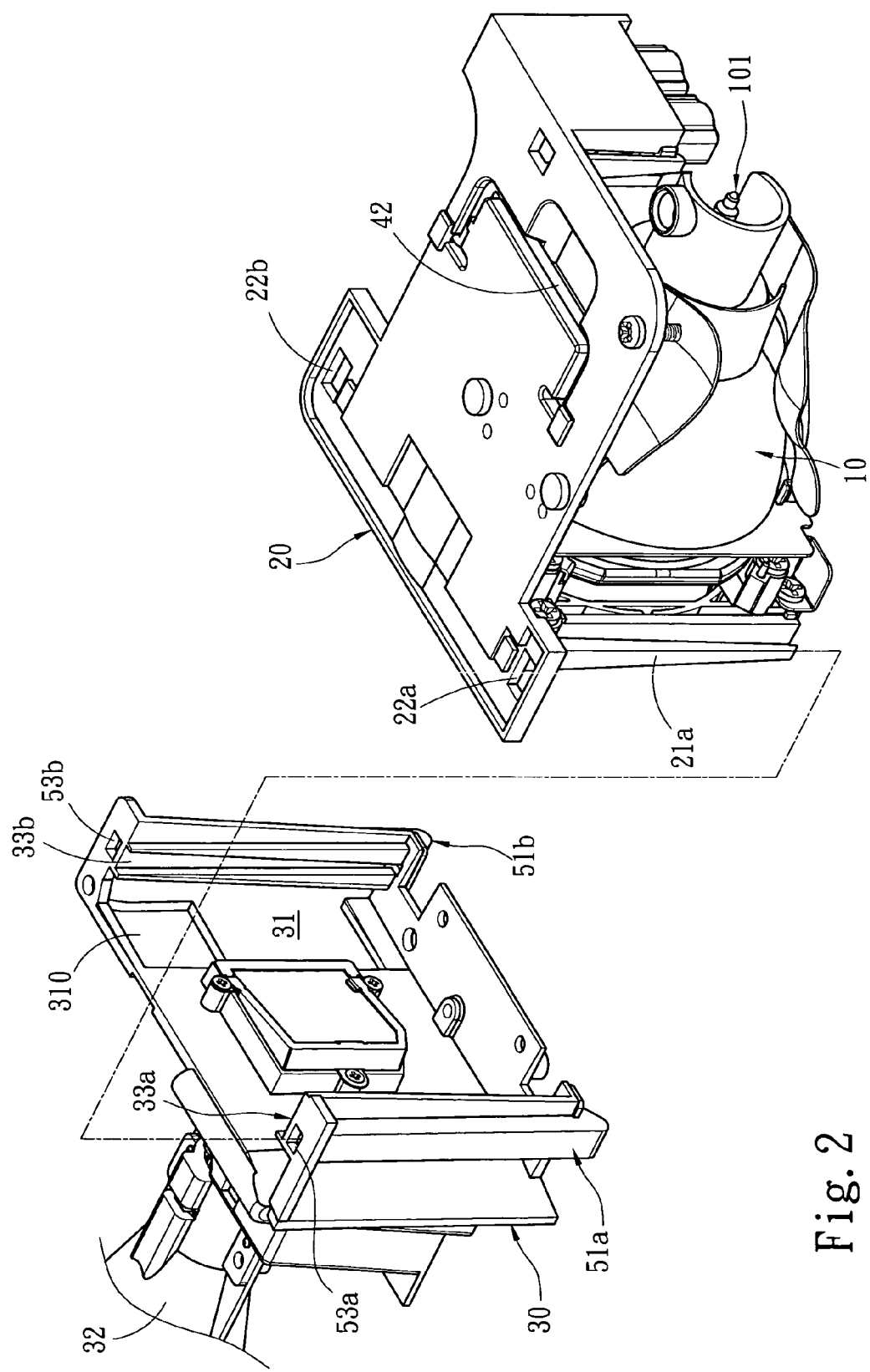
FIG. 2 is a schematic view of the present invention snowing the socket and the bracing bracket in a separated condition.
Figure 3:
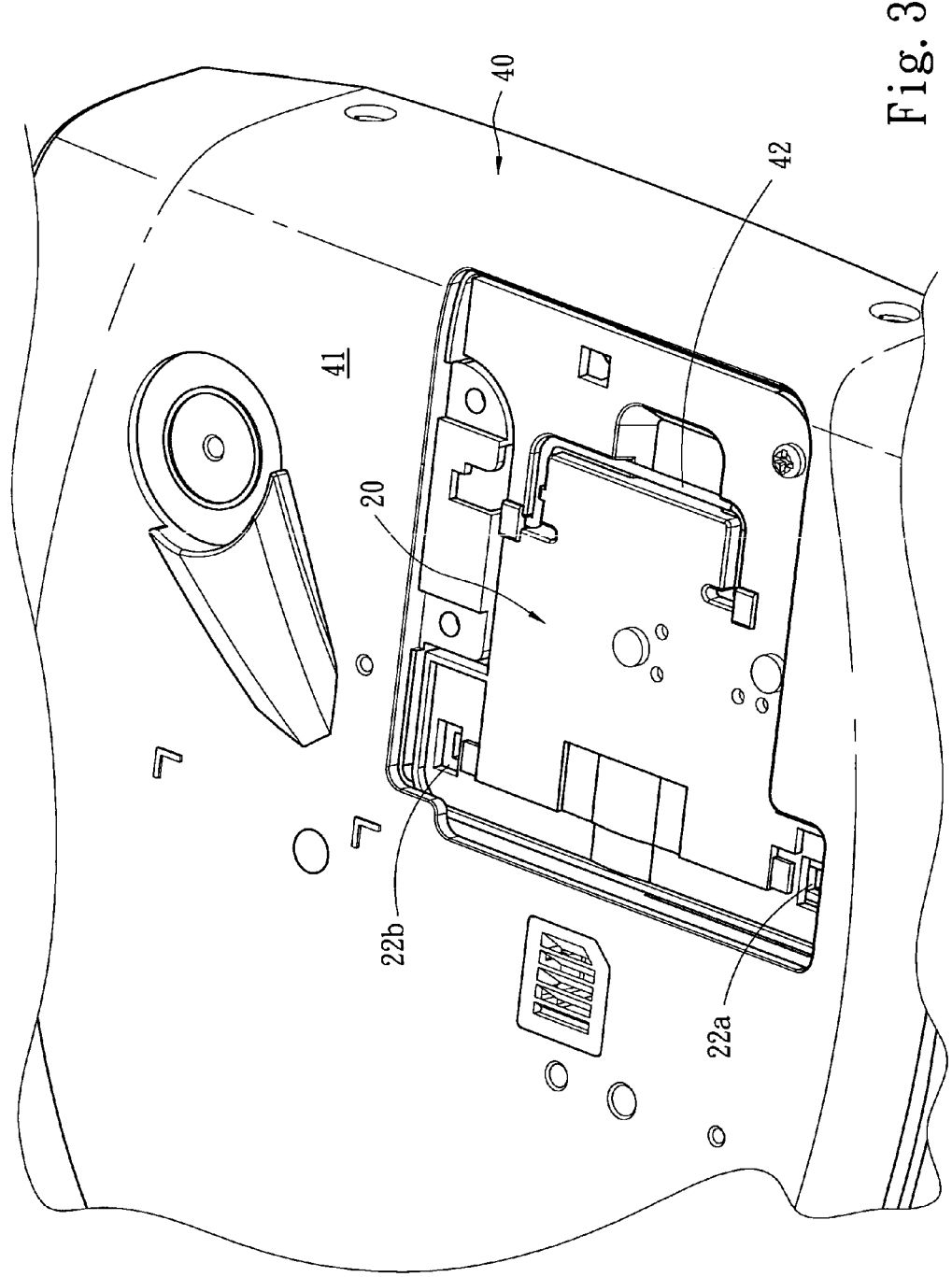
FIG. 3 is a schematic view of the present invention showing the projector is turned upside down to expose the socket.

Referring to FIGS. 2 and 3, the socket 20 has a pair of parallel ribs 21a and 21b on two sides. The socket 20 is mounted on the bracing bracket 30 by sliding the ribs 21a and 21b in a pair of tracks 33a and 33b located on the bracing bracket 30. Adopted such a modular design, when the burner id damaged or blasted, the socket 20 and the damaged burner may be removed together for replacement. The socket 20 is removed from the bottom of a projector 40. When the burner is blasted or replacement is needed, the projector 40 has to be turned upside down (referring to FIG. 4) to make the bottom side 41 to face upwards and expose the socket 20. A fastening element (such as screw or latch) is unfastened, and the socket 20 and the damaged burner may be removed from the projector 40 through a towing bar 42 for replacement.

Figure 4:
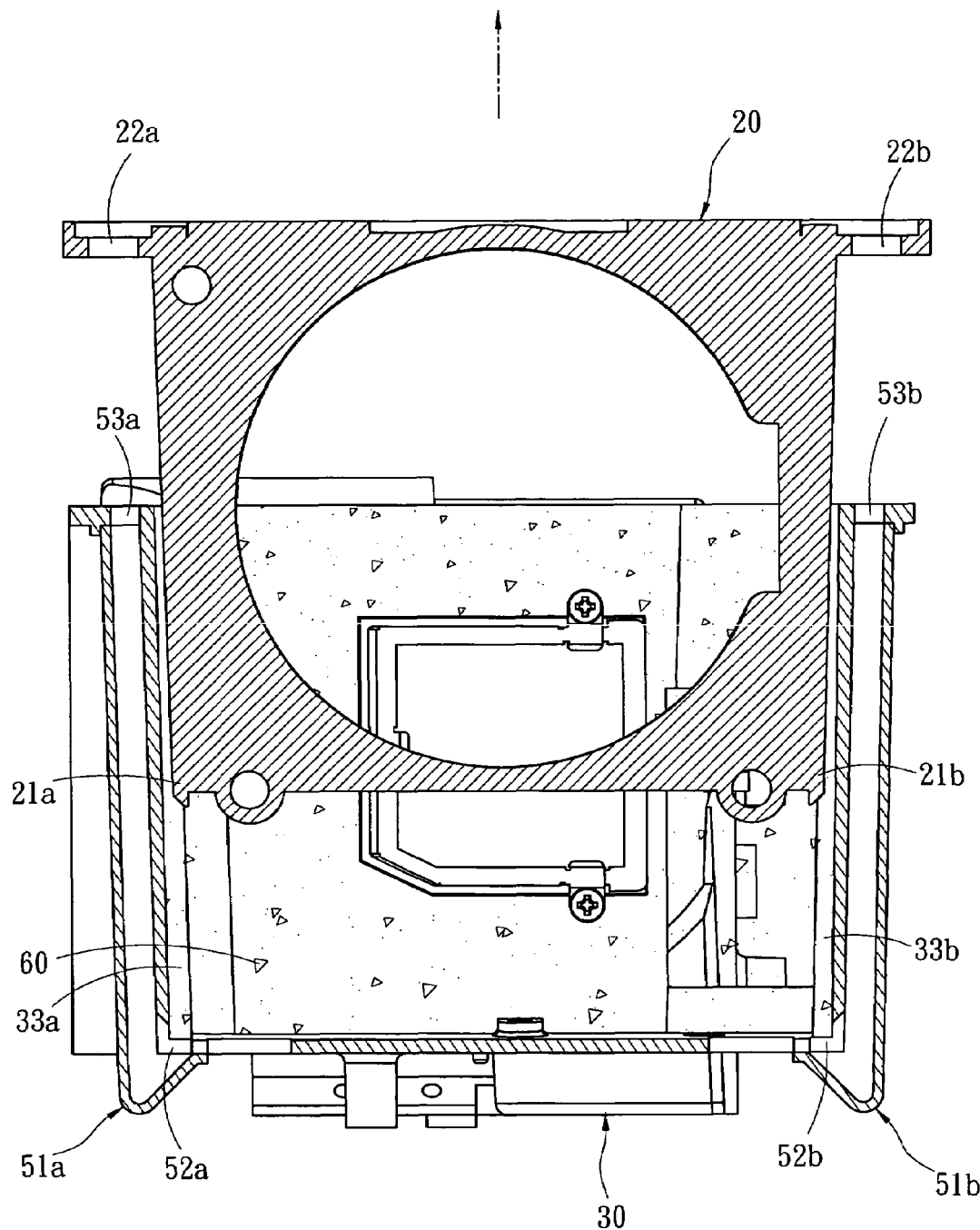
FIG. 4 is a schematic view of the invention showing the socket is removed from the bracket of the projector in a upside down condition.
Figure 5:
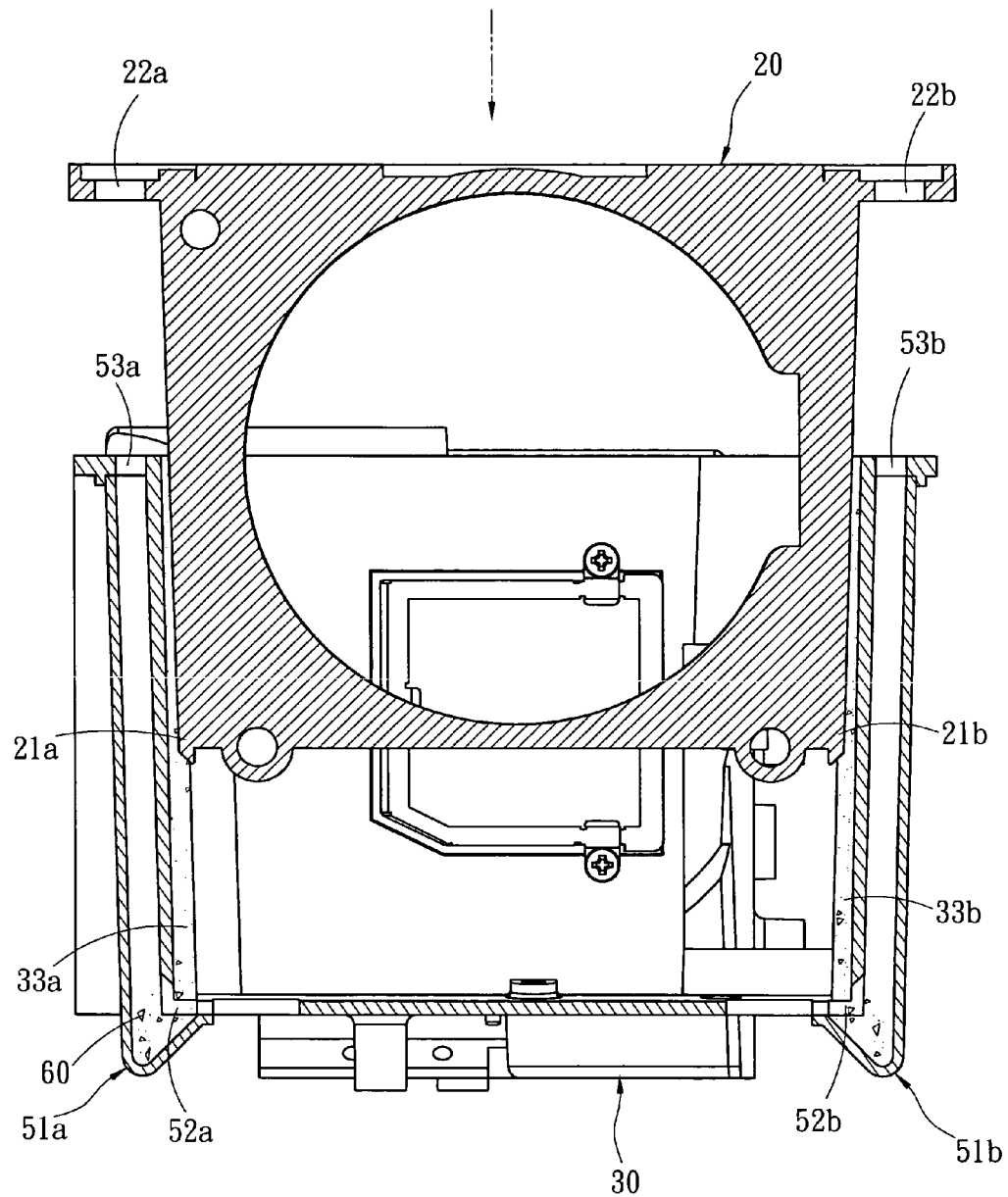
FIG. 5 is a schematic view of the invention showing a replacing socket contained a good burner is placed in the tracks of the bracket to push the debris into the debris collection ducts.

Referring to FIGS. 2 and 4, the burner debris collection apparatus according to the invention mainly includes a pair of debris collection ducts 51a and 51b on the bracing bracket 30. The debris collection ducts 51a and 51b communicate with the tracks 33a and 33b, and preferably through apertures 52a and 52b located on one end of tracks 33a and 33b in the socket 20 sliding direction (referring to FIG. 5). Hence after the UHP discharge lamp or halogen lamp has blasted, the operator removes the socket 20 and the damaged burner from the bracing bracket 30 of the projector 40 (referring to FIG. 4). After having cleared most of the scattered burner debris 60, there are usually a small portion of the burner debris 60 trapped in the track 33a and 33b. The operator places a replacing socket 20 that contains a good burner in the tracks 33a and 33b, the ribs 21a and 21b of the socket 20 slide in the tracks 33a and 33b to push the trapped burner debris 60 into the debris collection ducts 51a and 51b through the apertures 52a and 52b. The debris collection ducts 51a and 51b have respectively a debris discharge outlet 53a and 53b directing downwards. Once the replacement of the socket 30 and the burner is finished, the projector 40 is turned upright, and the burner debris 60 gathered in the debris collection ducts 51a and 51b are discharged through the debris discharge outlets 53a and 53b due to gravity force. By shaking the projector lightly, the burner debris 60 may be removed thoroughly.

Figure 6:
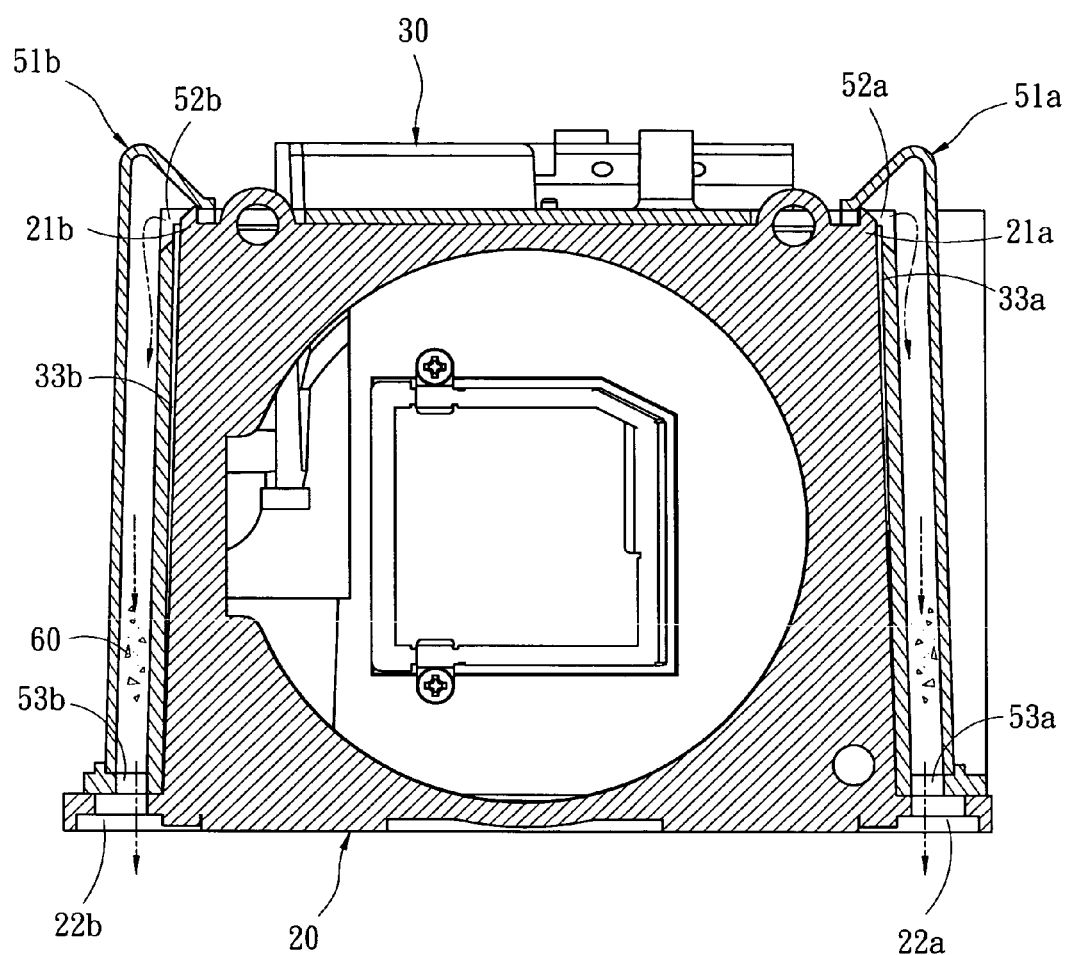
FIG. 6 is a schematic view of the invention in an operating condition showing burner debris in the debris collection ducts drop out through debris discharge outlets and openings.

In addition to the debris discharge outlets 53a and 53b, openings 22a and 22b may be formed on the other end of the tracks corresponding to the debris discharge outlets 53a and 53b (referring to FIG. 6). Hence even after the socket 30 and the good burner have been replaced in the projector 40, the burner debris 60 in the debris collection ducts 51a and 51b may be still be removed.

Figure 7:
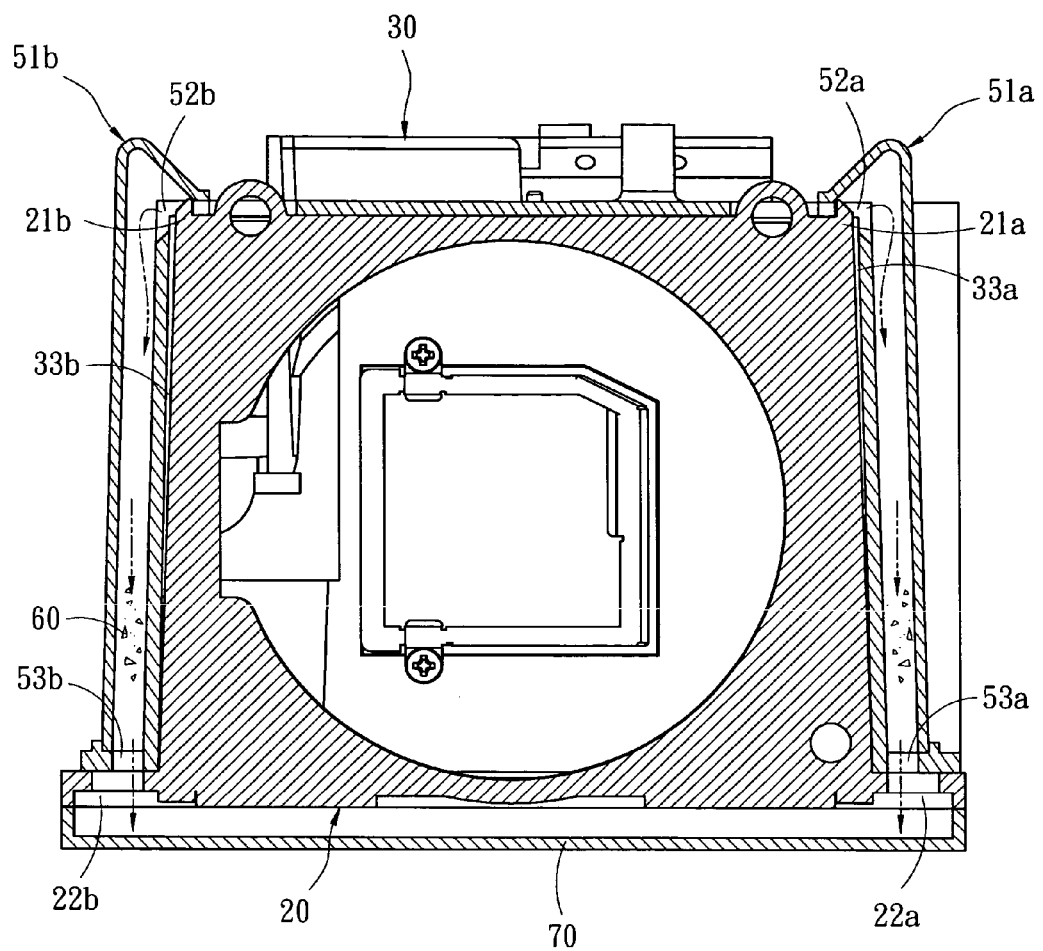
FIG. 7 is a schematic view of another embodiment of the present invention showing a debris collection tray is located at the bottom of the projector.

Refer to FIG. 7 for another embodiment of the invention. It has a debris collection tray 70 located at the bottom of the projector 40 that is designed as a drawer to hold the burner debris 60 discharged from the debris discharge outlets 53a, 53b and/or openings 22a and 22b. Thus gathering and clearing of the burner debris 60 are more convenient and easier.

By means of the construction set forth above, burner debris may be collected and cleared easier. And even a general user can clear the burner debris gathered in the tracks easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A burner debris collection apparatus for projectors to assist collecting burner debris scattered on a socket after a burner has been blasted, comprising:
   a bracing bracket having a pair of tracks to allow the socket to be installed by sliding and debris collection ducts, the debris collection ducts communicating with the tracks respectively and have a debris discharge outlet; and
   a pair of ribs located on the socket slidable in the tracks to mount the socket and push the debris into the debris collection ducts.

2. The burner debris collection apparatus of claim 1, wherein the debris collection ducts communicate with the tracks through apertures.

3. The burner debris collection apparatus of claim 1, wherein the apertures are located on a distal end of the tracks in the sliding direction of the socket.

4. The burner debris collection apparatus of claim 1, wherein the debris discharge outlet are directed downwards to discharge the debris by gravity force.

5. The burner debris collection apparatus of claim 1, wherein the socket has openings corresponding to the debris discharge outlet to discharge the burner debris gathered in the debris collection ducts.

6. The burner debris collection apparatus of claim 1 further having a debris collection tray located beneath a projector to hold the burner debris discharged through the debris discharge outlet.

7. The burner debris collection apparatus of claim 6, wherein the debris collection tray can be pulled as a drawer.

* * * * *